United States Patent [19]

Inoue et al.

[11] 4,436,172
[45] Mar. 13, 1984

[54] MOTORCYCLE HAVING AN ENGINE WITH A TURBO-SUPERCHARGER

[75] Inventors: Kazuo Inoue, Tokyo; Tsuneo Otsuka, Wako, both of Japan

[73] Assignee: Honda Giken Kogyo Kabushiki Kaisha, Tokyo, Japan

[21] Appl. No.: 342,368

[22] Filed: Jan. 25, 1982

[30] Foreign Application Priority Data

Jan. 24, 1981 [JP] Japan ................................ 56-9174

[51] Int. Cl.³ ...................... B62D 63/04; F02D 23/00
[52] U.S. Cl. ...................................... 180/219; 60/602; 60/605
[58] Field of Search ................... 180/219; 60/600, 601, 60/602, 603, 605

[56] References Cited

U.S. PATENT DOCUMENTS 3,386,427 6/1968 Powell et al. ...................... 60/601
4,204,585 5/1980 Tsuboi et al. ...................... 180/219

OTHER PUBLICATIONS

"More Turbos from Japan", *Automotive Engineering*, vol. 89, No. 4, pp. 65–68, Apr. 1981.

*Primary Examiner*—Joseph F. Peters, Jr.
*Assistant Examiner*—Donn McGiehan
*Attorney, Agent, or Firm*—Armstrong, Nikaido, Marmelstein & Kubovcik

[57] ABSTRACT

A motorcycle having an engine with a turbo-supercharger in which the engine is mounted on a body frame between front and rear wheels. A first and a second muffler are disposed on the opposite sides of the rear wheel. An exhaust pipe extending from the engine is connected to the first muffler. The supercharger has a turbine disposed in the exhaust pipe so that it is driven by exhaust gas flowing through the exhaust pipe. A waste pipe is branched from the exhaust pipe at a position upstream of the turbine and is connected to the second muffler for discharging a part of exhaust gas while bypassing the turbine. With this arrangement, layout of the exhaust system can be effected neatly to provide a good appearance as well as a good balance in weight-distribution and in banking angle of the motorcycle.

6 Claims, 2 Drawing Figures

4,436,172

MOTORCYCLE HAVING AN ENGINE WITH A TURBO-SUPERCHARGER

BACKGROUND AND SUMMARY OF THE INVENTION

The present invention relates to a motorcycle having an engine with a turbo-supercharger in which an engine is mounted on a body frame between front and rear wheels. A turbo-supercharger is driven by exhaust gas from the engine to compress suction air fed to the engine to enhance the charging efficiency and increase the output performance of the engine.

With such an engine, it is required that a part of exhaust gas be directly discharged outside so as to bypass the turbo-supercharger for properly controlling supercharged pressure of the engine.

It is an object of the present invention to provide a simple and effective motorcycle of the type as described which can meet the requirements as noted above; is orderly in layout of the exhaust system to provide a good external appearance; and can provide a good balance in weight on left and right sides of the motorcycle as well as a good balance in banking angle.

In order to achieve the above-mentioned object, the major feature of the present invention resides in that a first muffler and a second muffler are disposed at one side and at the other side, respectively, of the rear wheel, the first muffler being connected to an exhaust pipe extending from the engine, the supercharger having a turbine disposed in the exhaust pipe, and the second muffler being connected to a waste pipe branched from the exhaust pipe at a position upstream of the turbine.

The above and other objects, features and advantages of the invention will become apparent from the detailed description of a preferred embodiment when taken in conjunction with the accompanying drawings.

DESCRIPTION OF THE PREFERRED EMBODIMENT

Figure 1:
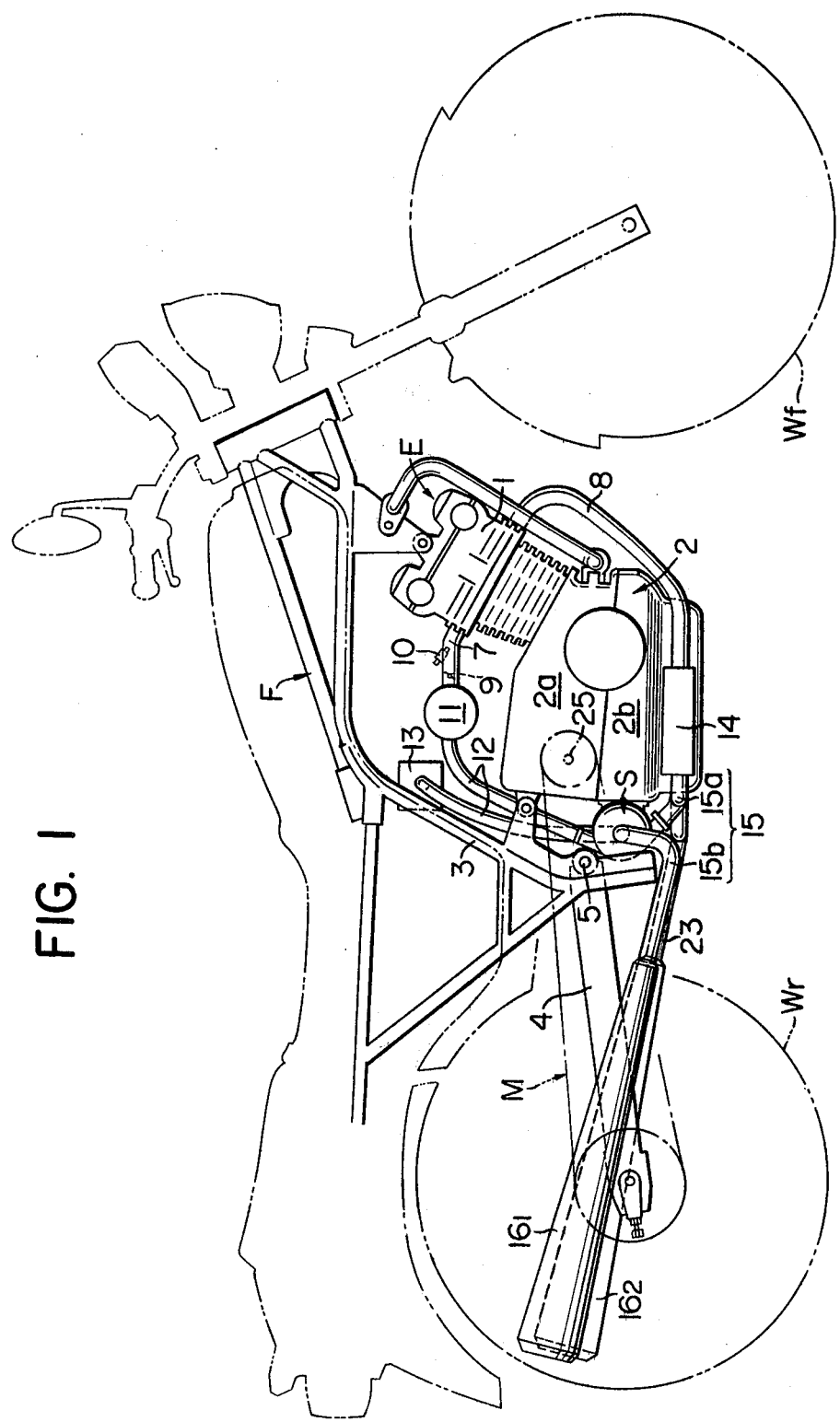
FIG. 1 is a general side elevation of a motorcycle in accordance with the present invention.

In the following, one embodiment of the present invention will be described with reference to the accompanying drawings. In FIG. 1, on a body frame F of the motorcycle, there is suspended and supported, halfway between front and rear wheels Wf, Wr, an engine E having a crank case and transmission case 2 located at a lower end of an engine block 1 which is substantially stood upright. The transmission case 2 is composed of an upper case 2a and a lower case 2b connected together, which are separable into upper and lower portions, the lower case 2b having a turbo-supercharger S mounted on the rear surface thereof.

Above the turbo-supercharger S, a forward end of a rear fork 4 is pivotally supported at 5 on a center tube 3 of the body frame F for upward and downward swinging movement, and the rear wheel Wr is rotatably mounted on the rear end of the rear fork in a conventional manner.

Figure 2:
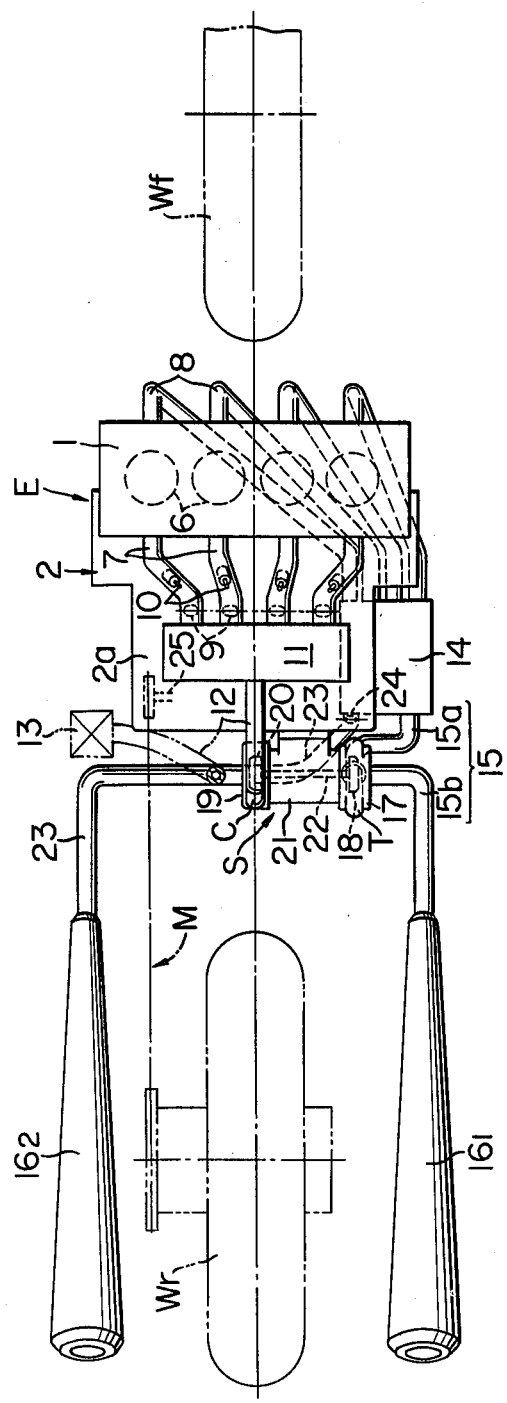
FIG. 2 is a plan view of an engine with a turbo-supercharger.

Next, the construction of the engine E with the turbo-supercharger S will be described with reference to FIGS. 1 and 2. The engine block 1 is formed with four cylinders 6, corresponding to which four independent suction pipes 7, 7 ... and four independent exhaust pipes 8, 8 ... are connected to the rear surface and front surface, respectively, of the engine block 1, each of the independent suction pipes 7 being provided with a throttle valve 9 and a fuel jet nozzle 10 positioned downstream of the valve 9. Four independent suction pipes 7, 7 ... have their upstream ends connected to a single prechamber 11 disposed at an upper part of the transmission case 2. This prechamber 11 is connected to an air cleaner 13 through a single common suction pipe 12. On the other hand, four independent exhaust pipes 8, 8 ... have their downstream ends connected to a single exhaust manifold box 14 disposed below the engine E biasedly toward one side thereof (in FIG. 2, on the right side below the transmission case 2), which exhaust manifold box 14 is connected through a single common exhaust pipe 15 to a first muffler $16_1$ disposed on one side of the rear wheel Wr. The turbo-supercharger S is provided between the common exhaust pipe 15 and the common suction pipe 12.

The turbo-supercharger S comprises a turbine T disposed intermediately in the common exhaust pipe 15 and a compressor C disposed intermediately in the common suction pipe 12, the turbine T being designed so that a turbine disc 18 is housed in a turbine housing 17 formed in the midst of the common exhaust pipe 15, the compressor C being designed so that a compressor disc 20 is housed in a compressor housing 19 formed in the midst of the common suction pipe 12. Both the housings 17 and 19 are integrally connected through a bearing holder 21, and both the discs 18, 20 are connected by a rotary shaft 22 supported on the bearing holder 21 so that they are rotated together.

The turbo-supercharger S is mounted on the transmission case 2 in such a manner that the compressor C is disposed in a laterally central position of the prechamber 11 and the turbine T is disposed at a position adjacent to the outside surface of the engine E and offset towards the side of the exhaust manifold box 14 with respect to a longitudinal center line of the vehicle while the bearing holder 21 is fastened to the rear face of the lower case 2b of the transmission case 2.

To the exhaust path (the exhaust manifold box 14 in the illustrated embodiment) upstream of the turbine T is connected a waste pipe 23 so as to be extended therefrom. The waste pipe 23 has a rear end connected to a second muffler $16_2$ which is disposed opposite to the first muffler $16_1$ with the rear wheel Wr sandwiched therebetween. The waste pipe 23 is internally provided with a control valve 24 for regulating the flow of exhaust gas passing therethrough.

During the operation of the engine E, power thereof is taken out from an output shaft 25 of the transmission system to drive the rear wheel Wr through a chain transmission device M in a conventional manner, the chain transmission device M being arranged adjacent the second muffler $16_2$.

Exhaust gases discharged from the cylinders 6 to the independent exhaust pipes 8 during the exhaust stroke of the engine E are merged at the exhaust manifold box 14 and thereafter pass through the turbine T via the common exhaust pipe 15 whereupon exhaust energy is applied to the turbine disc 18. This energy causes the turbine disc 18 to rotate to drive the compressor disc 20 through the rotary shaft 22, resulting in that air taken into the common suction pipe 12 from the air cleaner 13 is compressed by the compressor C and fed into the prechamber 11, from which the air is distributed into the independent suction pipes 7 and regulated in flow amount by means of the throttle valves 9. Thereafter, in each suction pipe 7, the air is mixed with fuel jetted from the jet nozzle 10, which mixture is then supplied to the cylinder 6 during the suction stroke of the engine E. Thus, a high charging efficiency of the air-fuel mixture is obtained in each cylinder 6 and upon combustion of the mixture, the engine E exhibits a high output. The exhaust gases passed through the turbine T are discharged into the atmosphere through the first muffler $16_1$.

During this operation, when supercharged pressure of the engine E, that is, outlet pressure of the compressor C exceeds a predetermined level, the control valve 24 is appropriately opened, then the exhaust gas introduced into the exhaust manifold box 14 partly flows into the waste pipe 23 so as to bypass the turbine T whereby inlet pressure of the turbine T lowers to decrease the number of revolutions thereof so that the supercharged pressure can be regulated to a predetermined value.

Even if a pressure pulsation occurs within the independent suction pipes 7 due to the intermittent operation of the suction valve of the engine E, the pressure pulsation is damped by the prechamber 11 to prevent a surging phenomenon of the compressor C.

As described above, in the present invention, the first muffler and the second muffler are disposed on one side and the other side, respectively, of the rear wheel, and the rear end of the exhaust pipe of the engine, intermediate of which passage the turbine of the turbo-supercharger is disposed, is connected to the first muffler whereas the waste pipe extended from the exhaust path upstream of the turbine is connected to the second muffler. With this arrangement, the supercharged pressure of the engine is controlled by suitably detouring a part of the exhaust gas of the engine through the waste pipe, and particularly, the partial exhaust gas escaping into the waste pipe is fed to the second muffler independent of the first muffler connected to the outlet of the turbine, so that no influence is exerted on the back pressure of the turbine and, therefore, the supercharged pressure can be controlled accurately. Furthermore, since the exhaust system after the waste pipe and the exhaust system after the turbine are independently disposed from each other, the length of piping in each exhaust system can be suitably selected to easily meet the engine performance. Moreover, the weight balance on left and right sides of the motorcycle and the balance of bank angles can be easily kept by the first and second mufflers disposed on both sides of the rear wheel, and better external appearance thereof can be obtained.

What is claimed is:

1. A motorcycle having an engine with a turbo-supercharger mounted on a body frame between front and rear wheels, comprising: a first muffler and a second muffler arranged on opposite sides of said rear wheel, an exhaust pipe having a front end connected to said engine and a rear end connected to said first muffler, said turbo-charger having a turbine disposed in said exhaust pipe and a compressor coupled for rotation with said turbine, a waste pipe branching from said exhaust pipe at a position upstream of said turbine and connected to said second muffler, and a control valve provided internally of said waste pipe for regulating the flow of exhaust gas passing therethrough and adapted to open when the outlet pressure of said compressor exceeds a predetermined level.

2. A motorcycle as set forth in claim 1, wherein said supercharger is arranged so that said turbine is positioned in laterally offset relation to a longitudinal center line of said body frame.

3. A motorcycle as set forth in claim 1, further comprising a power transmission device arranged on one side of said body frame for driving connection of an output shaft of said engine and said rear wheel, said second muffler being arranged on that side of said rear wheel on which said power transmission device is arranged.

4. A motorcycle as set forth in claim 1, wherein said engine comprises an engine block and a transmission case integrally connected to a lower portion of said engine block, said supercharger being disposed within the transverse width of said transmission case.

5. A motorcycle as set forth in claim 1, wherein said engine includes a transmission case having upper and lower cases, and an air cleaner is disposed behind and upwardly of said upper case of the transmission case and connected to said compressor through a suction pipe while the turbo-supercharger is disposed rearwardly of said lower case of the transmission case, said waste pipe passing below said suction pipe.

6. A motorcycle as set forth in claim 1, wherein said waste pipe branches from said exhaust pipe sidewardly on the same horizontal plane on which the axis of said exhaust pipe lies, and extends beneath and in close vicinity to said compressor of the turbo-supercharger to lead to said second muffler.

* * * * *